(12) United States Patent
Lonnborg et al.

(10) Patent No.: US 8,858,282 B2
(45) Date of Patent: Oct. 14, 2014

(54) MARINE PROPULSION SYSTEMS AND INTAKE AIR SYSTEMS FOR MARINE PROPULSION SYSTEMS

(75) Inventors: Thomas S. Lonnborg, Lac du Flambeau, WI (US); Neil A. Rothe, Campbellsport, WI (US); Randall J. Poirier, Howards Grove, WI (US)

(73) Assignee: Brunswick Corporation, Lake Forest, IL (US)

( * ) Notice: Subject to any disclaimer, the term of this patent is extended or adjusted under 35 U.S.C. 154(b) by 149 days.

(21) Appl. No.: 13/605,425

(22) Filed: Sep. 6, 2012

(65) Prior Publication Data

US 2013/0273793 A1    Oct. 17, 2013

Related U.S. Application Data

(60) Provisional application No. 61/622,614, filed on Apr. 11, 2012.

(51) Int. Cl.
*B63B 35/73* (2006.01)

(52) U.S. Cl.
USPC .......................................... 440/88 A; 440/77

(58) Field of Classification Search
USPC ....................................... 440/88 N, 88 R, 77
See application file for complete search history.

(56) References Cited

U.S. PATENT DOCUMENTS

| | | | |
|---|---|---|---|
| 3,452,704 A | 7/1969 | Watkins | |
| 3,548,428 A | 12/1970 | Eades | |
| 4,371,348 A * | 2/1983 | Blanchard | 440/52 |
| 4,913,079 A | 4/1990 | Nishino | |
| 4,997,398 A | 3/1991 | Glen | |
| 5,129,847 A | 7/1992 | Mondek | |
| 5,176,551 A | 1/1993 | Blanchard et al. | |
| 5,409,409 A | 4/1995 | Blanchard et al. | |
| 5,505,644 A | 4/1996 | Ousley, II et al. | |
| 5,562,511 A | 10/1996 | Blanchard et al. | |
| 5,833,502 A | 11/1998 | Anderson | |
| 7,021,262 B1 | 4/2006 | Belter et al. | |
| 8,051,792 B2 | 11/2011 | Mochizuki | |
| 2002/0111088 A1 | 8/2002 | Tsubouchi et al. | |
| 2008/0026654 A1 | 1/2008 | Konakawa et al. | |
| 2009/0224132 A1 | 9/2009 | Mochizuki | |
| 2012/0028517 A1 | 2/2012 | Mochizuki et al. | |
| 2012/0325136 A1 | 12/2012 | McGill, Jr. | |

FOREIGN PATENT DOCUMENTS

| | | |
|---|---|---|
| FR | 2 467 774 A1 | 4/1981 |
| JP | 2109767 A | 4/1990 |
| WO | 2010/116576 A1 | 10/2010 |

OTHER PUBLICATIONS

Skorupa, Joe, "The Inside Outboard", Popular Mechanics, May 1991. 3 pages.
Bublitz, E., "Hidden Outboard Intellectual Property", Apr. 2012, 9 pages.
"Hidden Outboard Discussion", Mar. 5, 2013, 4 pages.
Airhart, Adam D., "Hidden Outboard IP", Feb. 28, 2013, 7 pages.
Sea Ray Venture (2013-) (w/currently no test numbers), BoatTEST. com, Aug. 12, 2012, available at http://web.archive.org/web/20120812044100/http://www.boattest.com/boats/boat_video.aspx?id=2752>, retrieved from internet on May 15, 2012, 9 pages.
International Search Report and Written Opinion for corresponding application PCT/US2013/033432, having a mailing date of Jun. 14, 2013.

* cited by examiner

*Primary Examiner* — Stephen Avila
(74) *Attorney, Agent, or Firm* — Andrus Intellectual Property Law, LLP (57) ABSTRACT

A marine propulsion system is for propelling a marine vessel in water. The system comprises a marine vessel and an outboard motor that is coupled to the marine vessel. The outboard motor has a first inlet that receives intake air for combustion. A second inlet is located on the hull of the marine vessel and a conduit conveys the intake air from the second inlet on the marine vessel to the first inlet on the outboard motor.

8 Claims, 8 Drawing Sheets

MARINE PROPULSION SYSTEMS AND INTAKE AIR SYSTEMS FOR MARINE PROPULSION SYSTEMS

CROSS-REFERENCE TO RELATED APPLICATION

The present utility application claims the benefit of and priority to U.S. Provisional Patent Application No. 61/622,614, filed Apr. 11, 2012, which is incorporated herein by reference in entirety.

FIELD

The present disclosure relates to marine propulsion systems and particularly to intake air systems for marine propulsion systems.

BACKGROUND

U.S. Patent Application Publication No. 2012/0028517 discloses a marine vessel including an outboard motor mounting portion provided at a stern of a hull, an outboard motor locating hole provided rearward of the outboard motor mounting portion and near the outboard motor mounting portion and penetrating vertically through the stern, a platform provided rearward of the outboard motor locating hole, and an outboard motor located in the outboard motor locating hole and mounted to the outboard motor mounting portion. This structure enables an occupant of the marine vessel to freely move in a space around the outboard motor on the platform and use the space.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Through research and experimentation, the present inventors have determined that when an outboard motor is partially or entirely enclosed by portions of the marine vessel, such as described in the above referenced patent publication, the enclosure experiences a negative pressure when the vessel is underway, which draws water vapor into the enclosure and, in turn, into engine air inlets on the outboard motor. Moist air that is drawn in under the cowl of the outboard motor condenses on hot engine components and causes mineral/salt deposits to form on the engine, resulting in corrosion and overheating problems. The present disclosure is directed to overcoming these types of problems.

In some examples, a marine propulsion system is for propelling a marine vessel in water. The system comprises a marine vessel and an outboard motor that is coupled to the marine vessel. The outboard motor has a first inlet that receives intake air for combustion. A second inlet is located on the hull of the marine vessel. A conduit conveys the intake air from the second inlet on the marine vessel to the first inlet on the outboard motor.

BRIEF DESCRIPTION OF THE DRAWINGS

Examples of marine propulsion systems and intake air systems for marine propulsion systems are described with reference to the following figures. The same numbers are used throughout the figures to reference like features and components.

DETAILED DESCRIPTION OF THE DRAWINGS

In the present description, certain terms have been used for brevity, clearness and understanding. No unnecessary limitations are to be inferred therefrom beyond the requirement of the prior art because such terms are used for descriptive purposes only and are intended to be broadly construed. The different methods and systems described herein may be used alone or in combination with other methods and systems. Various equivalents, alternatives, and modifications are possible within the scope of the appended claims.

Figure 1:
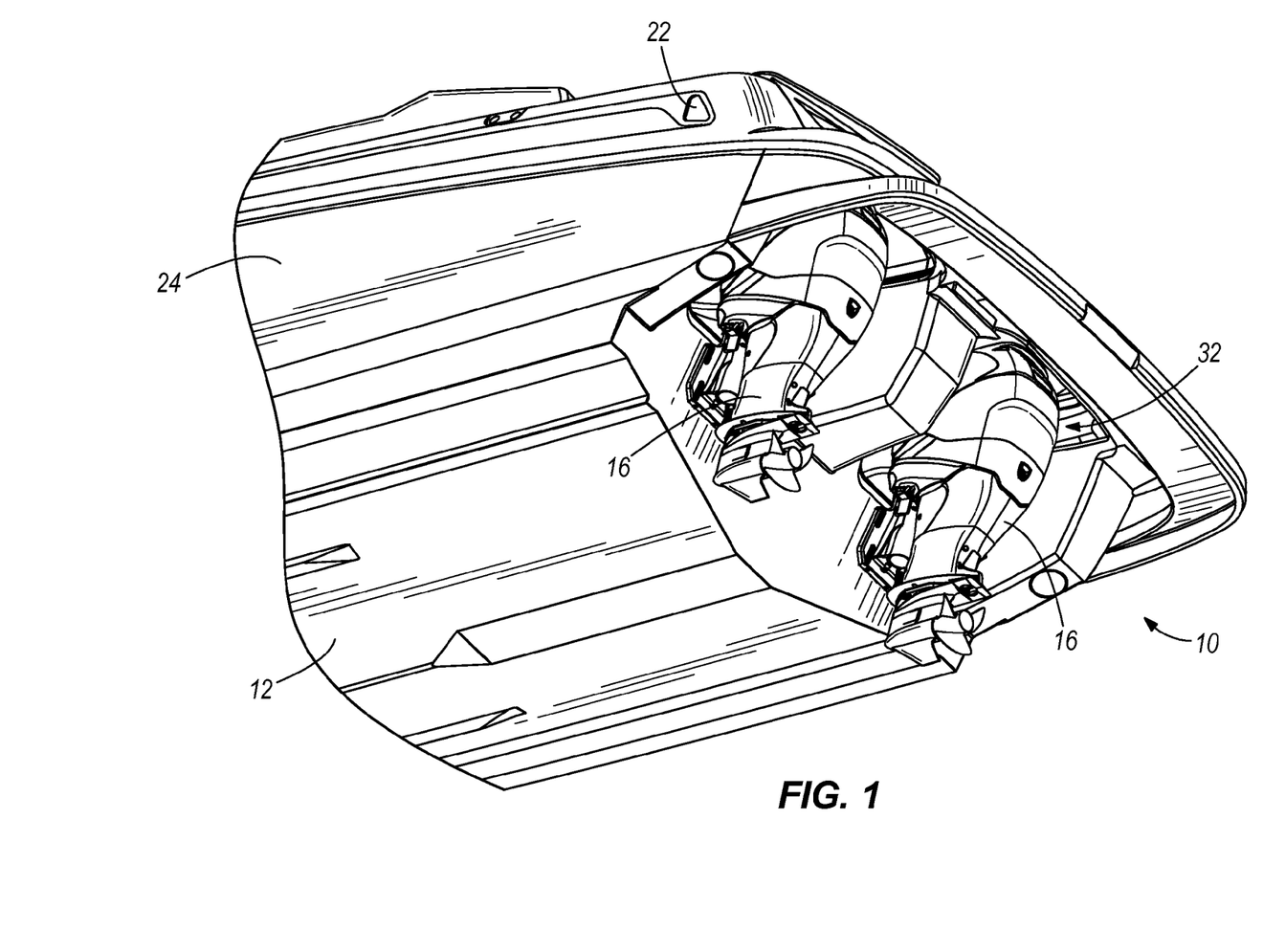
FIG. 1 is a perspective view looking up at a pair of outboard motors attached to the stern of a marine vessel.
Figure 2:
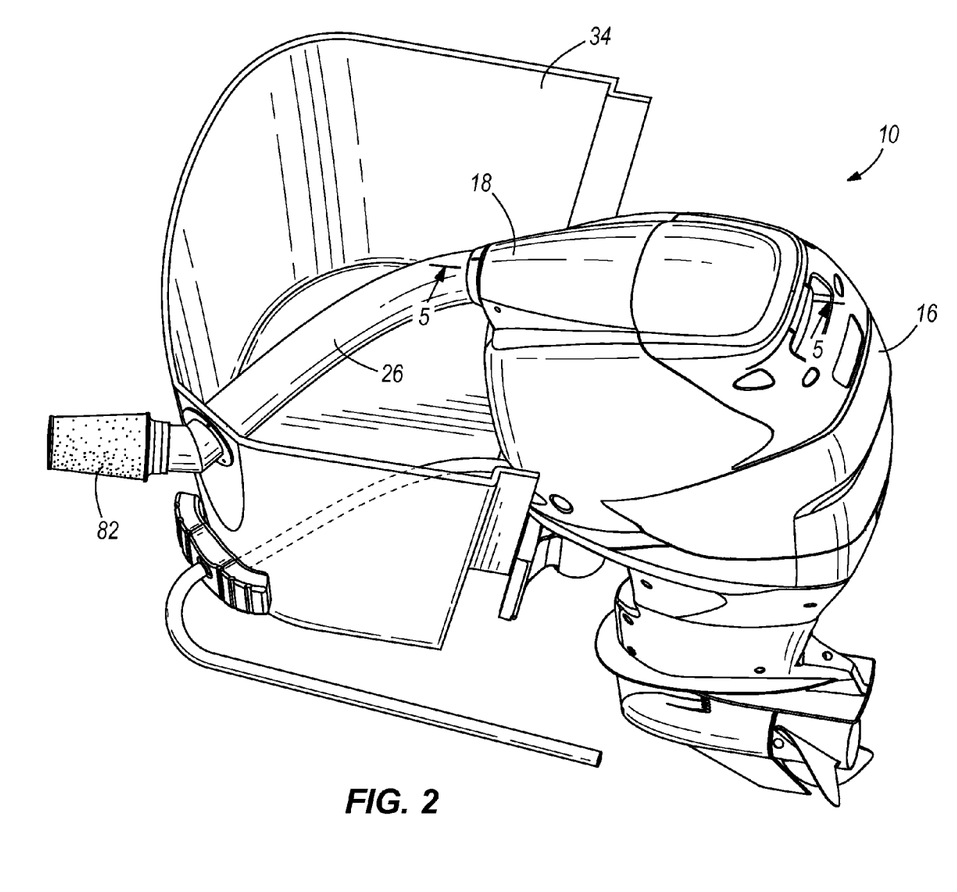
FIG. 2 is a perspective view looking down at one of the outboard motors shown in FIG. 1.
Figure 3:
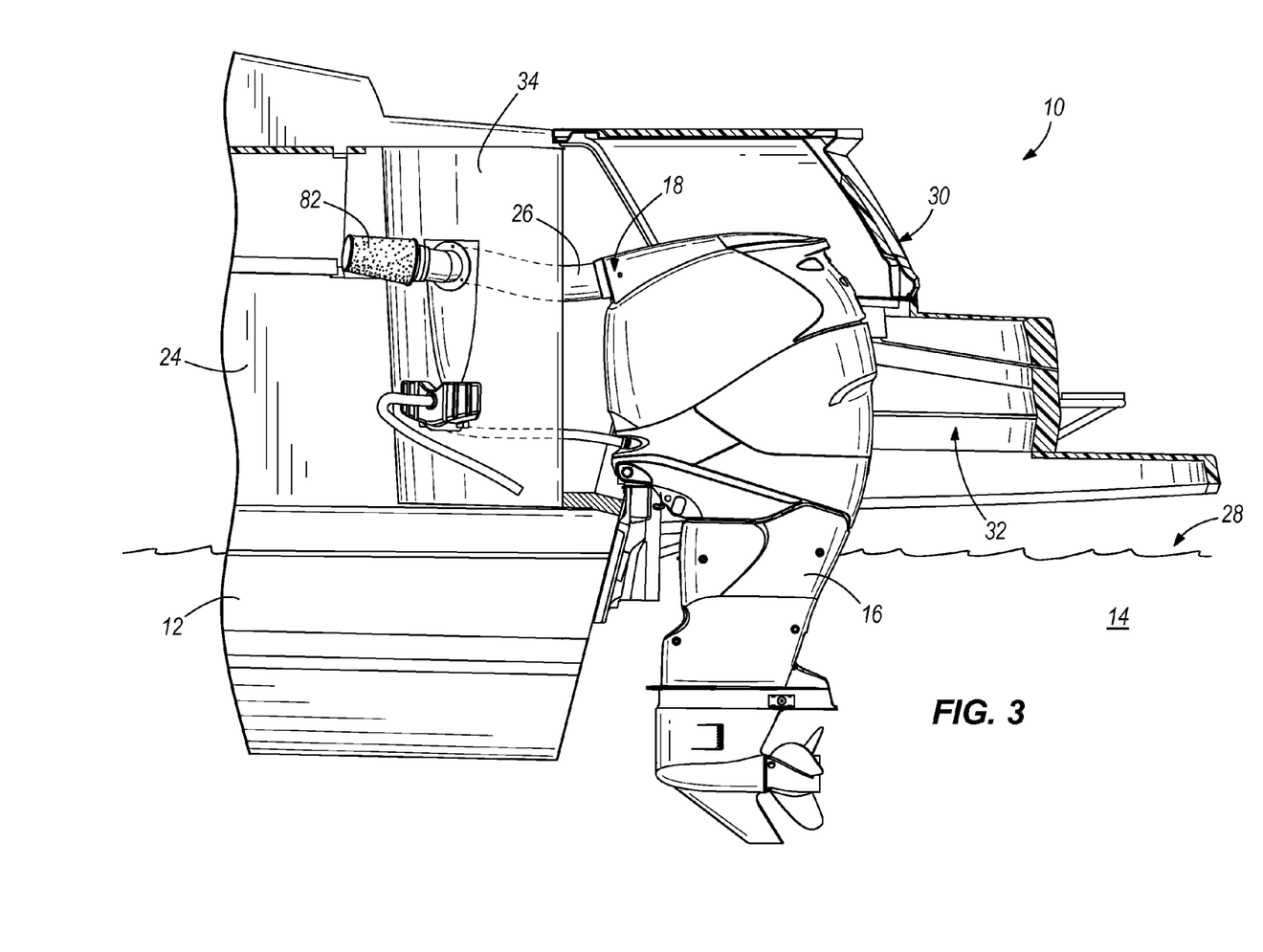
FIG. 3 is a side sectional view of the stern of the marine vessel, showing one of the outboard motors.

FIGS. 1-3 depict a marine propulsion system 10 for propelling a marine vessel 12 in water 14. The system includes the marine vessel 12 and at least one outboard motor 16 that is pivotally coupled to the marine vessel 12. The marine vessel 12 is exemplary and the concepts of the present disclosure can be used with other types of marine vessels. The number and configuration of outboard motors 16 can also vary from that which is shown.

Figure 5:
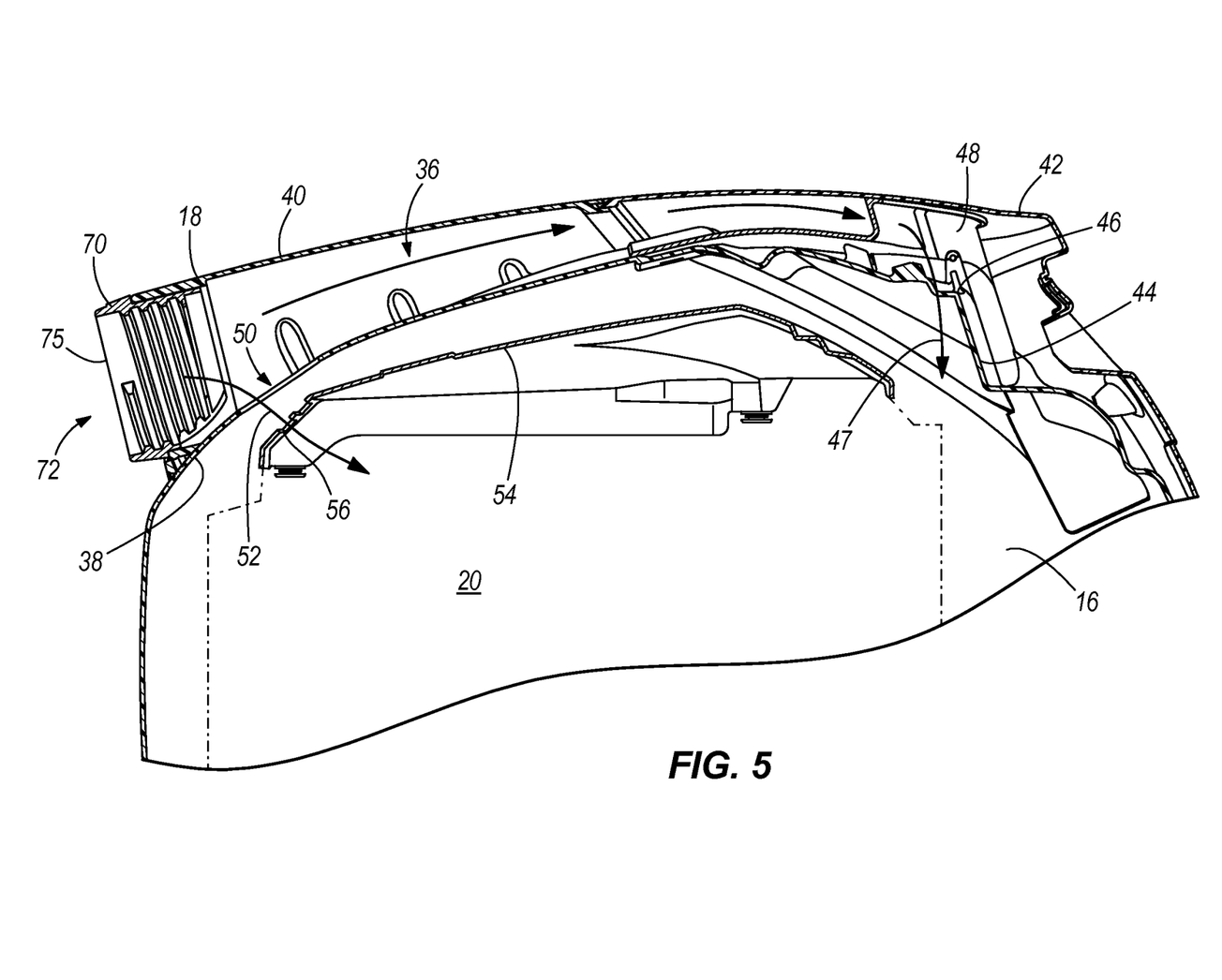
FIG. 5 is a view of Section 5-5 taken in FIG. 2.
Figure 6:
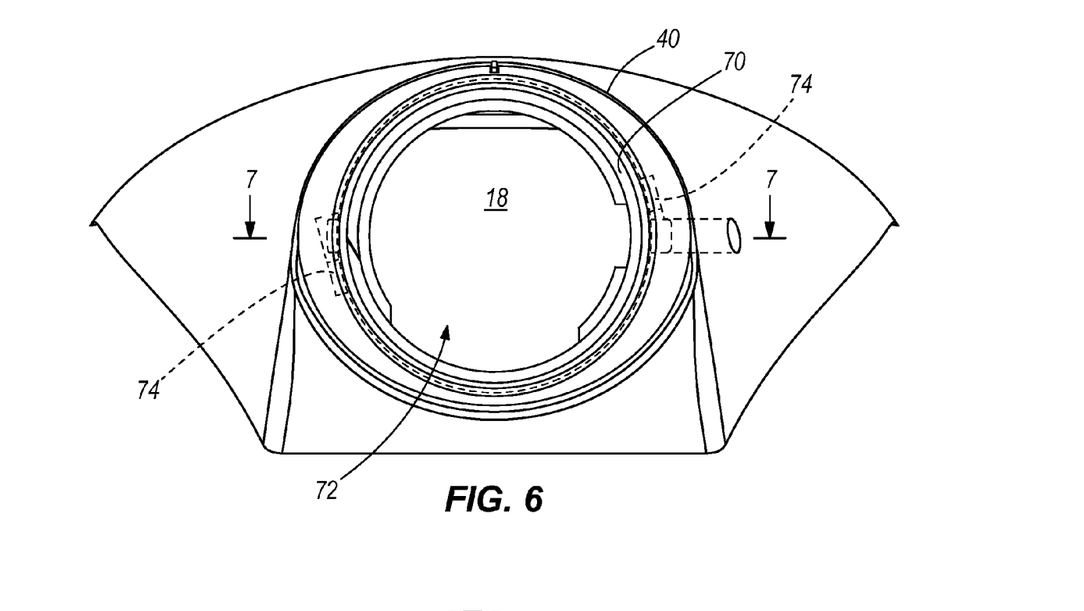
FIG. 6 is an end view of the intake apparatus.
Figure 7:
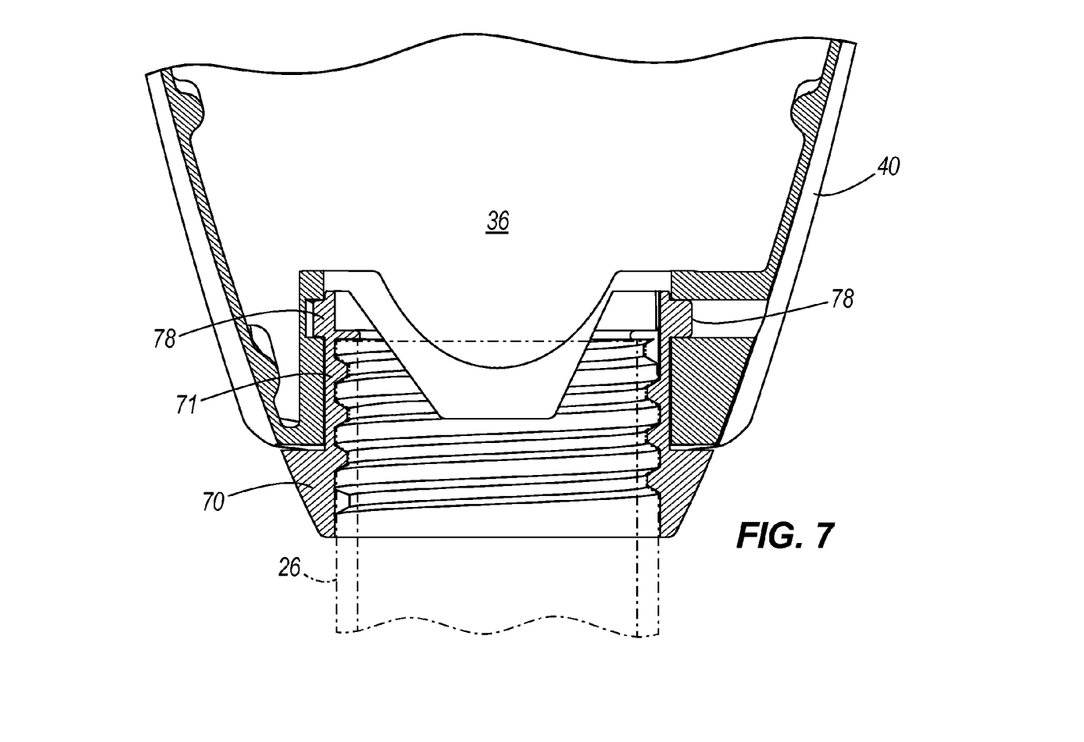
FIG. 7 is a view of Section 7-7 taken In FIG. 6.
Figure 8:
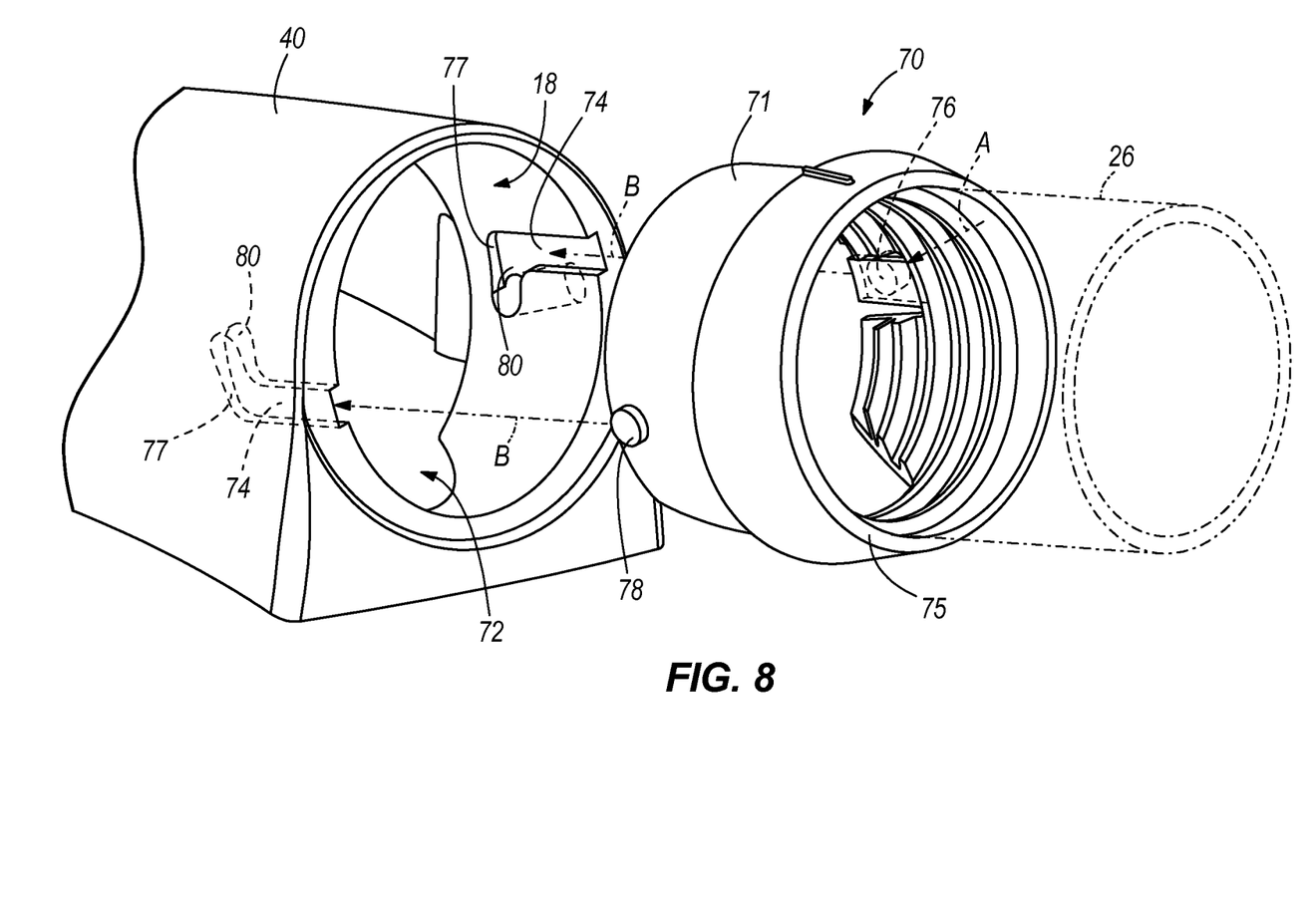
FIG. 8 is an exploded view of an adapter for connecting an intake air conduit to the outboard motor.
Figure 9:
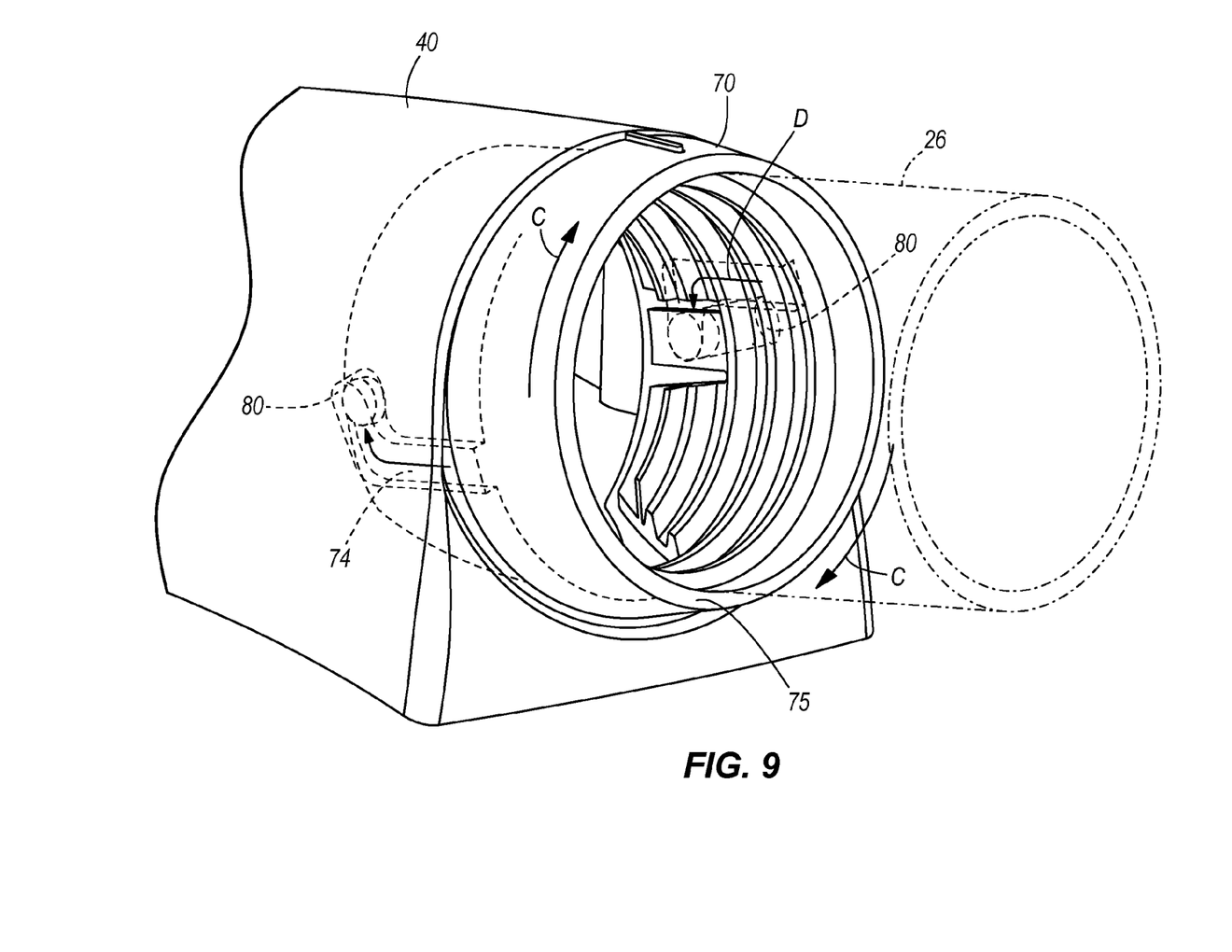
FIG. 9 is another view of the adapter connected to the outboard motor.

The outboard motors 16 each have a first inlet 18 that receives intake air for combustion by its internal combustion engine 20 (see FIG. 5). A second inlet 22 (see FIG. 1) is located on the body 24 of the marine vessel 12 for receiving the intake air. A conduit 26 conveys the intake air from the second inlet 22 on the marine vessel 12 to the first inlet 18 on the outboard motor 16. The second inlet 22 is shown on the starboard side of the marine vessel 12; however it will be recognized by those having ordinary skill in the art that the second inlet 22 can be located on either or both of the port and starboard sides of the marine vessel 12.

As shown in FIGS. 1-3, each outboard motor 16 is at least partially enclosed by the marine vessel 12 in an outboard motor enclosure 32 in a manner such that portions of the marine vessel 12 at least partially surround all sides of the outboard motor 16 that are above waterline 28. Optionally, a hatch can be provided at location 30 or at another location to provide access to the outboard motor 16.

In the example shown, the conduit 26 includes a flexible hose extending from the second inlet 22 to the first inlet 18. In this arrangement, operation of the outboard motor 16 creates a negative pressure in the enclosure 32, which advantageously does not negatively affect pressure of the intake air received by the second inlet 22. As shown in FIGS. 2 and 3, the conduit 26 extends through an engine well 34 and then to the second inlet 22 located on the body 24 of the marine vessel 12.

Figure 4:
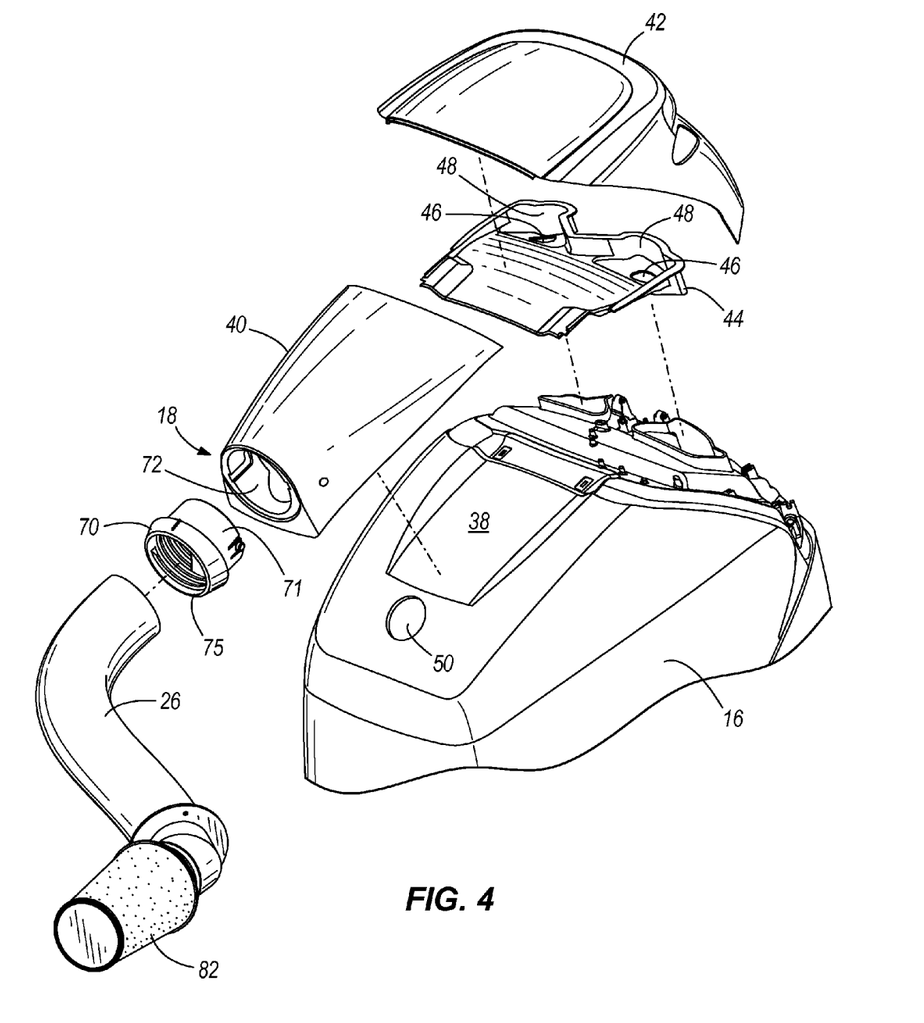
FIG. 4 is an exploded view showing components of an intake apparatus for the outboard motor.

Referring to FIGS. 4 and 5, the first inlet 18 is connected to an intake manifold 36 that distributes intake air for combustion and also for cooling the outboard motor 16. The manifold 36 is defined by a top cowl 38, an air intake duct 40 and a rear cowl 42. Further, a lower air intake tray 44 is provided on the top cowl 38 for deflecting intake air downwardly as shown at arrow 47 (see FIG. 5) for combustion in the outboard motor 16. Specifically, the lower air intake tray 44 and top cowl 38 define a pair of rear air inlet holes 46 (see FIG. 4) for receiving the intake air. Deflector walls 48 are angled with respect to air flow in the manifold 36 deflect the noted intake air into the inlet holes 46 as shown in FIG. 5.

As air enters the manifold 36 a front air inlet hole 50 in the top cowl 38 receives intake air and distributes the intake air downwardly as shown at arrow 52 (see FIG. 5) for cooling the outboard motor. A fly wheel cover 54 is disposed beneath the intake manifold 36 and has at least one air inlet slit or hole 56 receiving the intake air from the front air inlet hole 50 in the manifold 36. As shown in FIG. 5, the noted rear air inlet holes 46 are located aft of the front air inlet hole 50 on the outboard motor 16.

Referring to FIGS. 4-9, an adapter 70 connects the conduit 26 to the outboard motor 16. The adapter 70 is configured to engage with the outboard motor 16 in a removable, snap-fit connection. In the example shown, the first inlet 18 includes an opening 72 on the air intake duct 40 that receives the adapter 70. The opening 72 is sized slightly larger than an outer diameter of an end 71 of the adapter 70, such that the end 71 can be received by the opening 72. The opening 72 includes diametrically opposed channels 74 for receiving corresponding diametrically opposed protrusions 78 on the adapter 70. A flexible appendage 76 on one side of the end 71 of adapter 70 carries one of the protrusions 78. The appendage 76 is flexible in a radially inward direction, as shown at arrow A to allow the protrusion 78 thereon to be received by corresponding channel 74. As described herein below, the appendage 76 radially flexes back outwardly due to the natural resiliency of the appendage 76 so as to engage the air intake duct 40 in the noted snap-fit connection.

The end 71 of adapter 70 is inserted into the opening 72, as shown at arrows B, so that the protrusions 78 are aligned with the channels 74. The appendage 76 is manually flexed radially inwardly as shown at arrow A to allow the diametrically opposed protrusions 78 to fit within channels 74. Once the protrusions 78 reach the inside end 77 of channels 74, the adapter 70 is manually rotated with respect to the opening 72, as shown at arrows C in FIG. 9, until the protrusion 78 on the appendage 76 becomes aligned with opening 80, at which point the natural resiliency of the appendage 76 moves the appendage 76 radially outwardly so that the protrusion 78 thereon extends into the opening 80 in the radially outward direction, thus engaging the adapter 70 with the air intake duct 40 in the noted snap-fit connection. To remove the adapter 70, a tool can be manually inserted into the opposite end of the opening 80 to force the appendage 76 and its appendage 78 radially inwardly, as shown at arrow D, at which point adapter 70 is free to be manually rotated opposite to the direction of arrows C and then axially removed from the opening 72 in the direction opposite arrows B. An opposite end 75 of the adapter 70 is threaded for engaging with the conduit 26 in a threaded connection.

As shown in FIG. 4, an air filter 82 can be connected to the conduit 26 for filtering air flow there through. The location and type of air filter 82 can vary from that which is shown.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6 for any limitations of any of the claims herein, except for those in which the claim expressly uses the words "means for" together with an associated function.

What is claimed is:

1. A marine propulsion system for propelling a marine vessel in water, the system comprising:
   a marine vessel;
   an outboard motor that is coupled to the marine vessel, the outboard motor having a first inlet that receives intake air for combustion and a second inlet located on the hull of marine vessel;
   a conduit that conveys the intake air from the second inlet on the marine vessel to the first inlet on the outboard motor, wherein the second inlet extends through one of a port and a starboard side of the marine vessel;
   wherein the outboard motor is enclosed by the marine vessel and wherein operation of the outboard motor creates a negative pressure that does not affect pressure of the intake air received by the second inlet; and
   an adapter that connects the cooling air conduit to the outboard motor, wherein the adapter engages the conduit with the outboard motor in a releasable snap-fit connection;
   wherein the outboard motor has an opening that receives the adapter, wherein the opening on the outboard motor is sized slightly larger than an outer diameter of the adapter, and wherein the adapter is received by the opening in the snap-fit connection;
   wherein the opening on the outboard motor defines at least one channel and wherein the adapter comprises an appendage that is flexible radially inwardly to fit within the channel; and
   wherein the appendage springs back radially outwardly to engage the channel in the snap-fit connection.

2. The system according to claim 1, wherein the marine vessel at least partially surrounds all sides of the outboard motor that are above the water and further comprising a hatch that provides access to the outboard motor.

3. The system according to claim 1, comprising a protrusion extending radially outwardly from the appendage and engaging a recess in the top cowl when the adapter is rotated with respect to the top cowl.

4. The system according to claim 3, wherein the adapter is threaded for engaging with the conduit in a threaded connection.

5. The system according to claim 1, comprising an air filter connected to the conduit.

6. A marine propulsion system for propelling a marine vessel in water, the system comprising:
   an outboard motor having an internal combustion engine;
   an inlet on a front of the outboard motor, wherein the inlet receives intake air for combustion in the internal combustion engine and for cooling the internal combustion engine;

an intake air manifold that receives intake air from the inlet and conveys the intake air from the front of the outboard motor to a rear of the outboard motor;

at least one front air inlet hole in the intake air manifold that distributes the intake air for cooling the outboard motor;

a flywheel cover disposed beneath the intake manifold and having at least one air inlet hole that receives the intake air from the front air inlet hole in the intake air manifold; and at least one rear air inlet hole located aft of the front air inlet hole in the intake air manifold, wherein the rear air inlet hole distributes intake air for combustion in the outboard motor.

7. The system according to claim 6, further comprising a top cowl located on top of the internal combustion engine; and an air intake duct and rear cowl disposed on top of the top cowl, wherein the intake air manifold is defined by the top cowl, air intake duct, and rear cowl.

8. The system according to claim 6, further comprising a lower air intake tray defining the at least one rear air inlet hole, the lower air intake tray deflecting intake air downwardly into the rear air inlet hole for combustion.

* * * * *